(12) United States Patent
Zywiak et al.

(10) Patent No.: US 9,003,814 B2
(45) Date of Patent: Apr. 14, 2015

(54) TURBO AIR COMPRESSOR WITH PRESSURE RECOVERY

(75) Inventors: Thomas M. Zywiak, Suffield, CT (US); Louis J. Bruno, Ellington, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 559 days.

(21) Appl. No.: 13/294,958

(22) Filed: Nov. 11, 2011

(65) Prior Publication Data
US 2013/0118191 A1   May 16, 2013

(51) Int. Cl.
F25B 9/00 (2006.01)
B64D 13/06 (2006.01)

(52) U.S. Cl.
CPC ........ *B64D 13/06* (2013.01); *B64D 2013/0618* (2013.01); *B64D 2013/0648* (2013.01); *B64D 2013/0644* (2013.01); *Y02T 50/56* (2013.01)

(58) Field of Classification Search
CPC ........... B64D 13/06; F25B 9/004; F25B 9/06; Y02T 50/56
USPC ......... 62/87, 172, 401, 402; 60/39.183, 39.34
See application file for complete search history.

(56) References Cited

U.S. PATENT DOCUMENTS

| | | | |
|---|---|---|---|
| 4,684,081 A | 8/1987 | Cronin | |
| 5,709,103 A * | 1/1998 | Williams | 62/402 |
| 6,427,471 B1 * | 8/2002 | Ando et al. | 62/402 |
| 6,666,039 B2 * | 12/2003 | Mitani et al. | 62/172 |
| 6,913,636 B2 * | 7/2005 | Defrancesco et al. | 95/8 |
| 6,948,325 B1 * | 9/2005 | Axe et al. | 62/87 |
| 7,578,136 B2 * | 8/2009 | Derouineau et al. | 62/172 |
| 7,797,962 B2 | 9/2010 | Kresser et al. | |
| 7,970,497 B2 * | 6/2011 | Derouineau et al. | 701/3 |
| 2003/0005719 A1 * | 1/2003 | Mitani et al. | 62/402 |
| 2005/0166629 A1 * | 8/2005 | Axe et al. | 62/401 |
| 2006/0231680 A1 * | 10/2006 | Derouineau et al. | 244/118.5 |
| 2007/0006607 A1 * | 1/2007 | Hunt | 62/402 |
| 2007/0271952 A1 * | 11/2007 | Lui et al. | 62/402 |
| 2009/0232663 A1 * | 9/2009 | Mirsky et al. | 417/42 |
| 2009/0241546 A1 * | 10/2009 | Hegazy | 60/670 |
| 2010/0064886 A1 * | 3/2010 | Surawski et al. | 95/17 |
| 2010/0300414 A1 * | 12/2010 | Pursifull et al. | 123/559.1 |
| 2011/0036098 A1 * | 2/2011 | Baten | 60/806 |
| 2011/0194916 A1 * | 8/2011 | Wattel et al. | 414/222.01 |

FOREIGN PATENT DOCUMENTS

JP    2008210945    9/2008

OTHER PUBLICATIONS

English translation of Japanese Office Action dated Nov. 15, 2013 for Application No. 2012-246921; 3 pgs.
Japanese Office Action dated Nov. 15, 2013 for Application No. 2012-246921; 3 pages.

* cited by examiner

*Primary Examiner* — Mohammad M Ali
(74) *Attorney, Agent, or Firm* — Cantor Colburn LLP

(57) ABSTRACT

A method for operating an air-conditioning system for an aircraft includes compressing ambient air with a compressor driven by a shaft in communication with a motor and a turbine. The method includes forwarding the compressed air to an aircraft cabin for circulation and removing circulated compressed air from the aircraft cabin. The method also includes forwarding the circulated compressed air to the turbine, depressurizing the circulated compressed air in the turbine and capturing energy created by depressurizing the circulated compressed air.

15 Claims, 3 Drawing Sheets

TURBO AIR COMPRESSOR WITH PRESSURE RECOVERY

BACKGROUND OF THE INVENTION

The present disclosure relates to air conditioning and pressurizing systems for an aircraft, and more specifically, operations of the air conditioning and pressurizing systems for an aircraft.

Aircraft air-conditioning systems may include compressors operated with ambient air. These systems receive ambient air from outside the aircraft and utilize the compressor to adjust the air pressure before sending the air into the cabin of the aircraft. The ambient air pressure, and other conditions, varies considerably depending on the flight altitude. Such variations can affect the performance and efficiency of the compressors. The large demanded operation range that results from the variance in operating conditions cannot be covered completely in an efficient manner by one compressor.

Accordingly, aircraft air-conditioning systems have been developed that utilize more than one compressor. These multi-compressor aircraft air-conditioning systems include various operating modes in which various combinations of the various compressors are used. One drawback of these multi-compressor aircraft air-conditioning systems is that the systems place an increased power demand on the aircraft. In addition, currently available multi-compressor aircraft air-conditioning systems rely on external conditions, such as the ambient air pressure, to determine the operating mode of the aircraft air-conditioning system.

BRIEF DESCRIPTION OF THE INVENTION

In one embodiment, a method for operating an air-conditioning system for an aircraft includes compressing ambient air with a compressor driven by a shaft in communication with a motor and a turbine. The method also includes forwarding the compressed air to an aircraft cabin for circulation and removing circulated compressed air from the aircraft cabin. The method further also includes forwarding the circulated compressed air to the turbine, depressurizing the circulated compressed air in the turbine and capturing energy created by depressurizing the circulated compressed air.

In another embodiment, an air-conditioning system for an aircraft, includes a first compressed air source formed by a first compressor charged with ambient air and driven by a motor and a turbine and whose outlet is in direct or indirect communication with the aircraft cabin. The system also includes a discharge device operable for removing circulated compressed air from the aircraft cabin and a controller that controls the operation of first compressed air source and the discharge device. When an ambient air pressure is lower than a cabin air pressure, the controller instructs the discharge device to forward the circulated compressed air from the aircraft cabin to the turbine and when the ambient air pressure is equal to the cabin air pressure, the controller instructs the discharge device to forward the circulated compressed air from the aircraft cabin out of the aircraft. The turbine depressurizes circulated compressed air received from the aircraft cabin and captures energy created by depressurization.

In yet another embodiment, an air-conditioning system for an aircraft includes a first compressed air source formed by a first compressor charged with ambient air and driven by a motor and a turbine and whose outlet is in direct or indirect communication with the aircraft cabin. The system also includes a discharge device operable for removing circulated compressed air from the aircraft cabin and a controller that controls the operation of first compressed air source and the discharge device. When a difference between an ambient air pressure and a cabin air pressure exceeds a threshold value, the controller instructs the discharge device to forward the circulated compressed air from the aircraft cabin to the turbine and when the difference is below the threshold value, the controller instructs the discharge device to forward the circulated compressed air from the aircraft cabin out of the aircraft. The turbine depressurizes circulated compressed air received from the aircraft cabin and captures energy created by depressurization.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
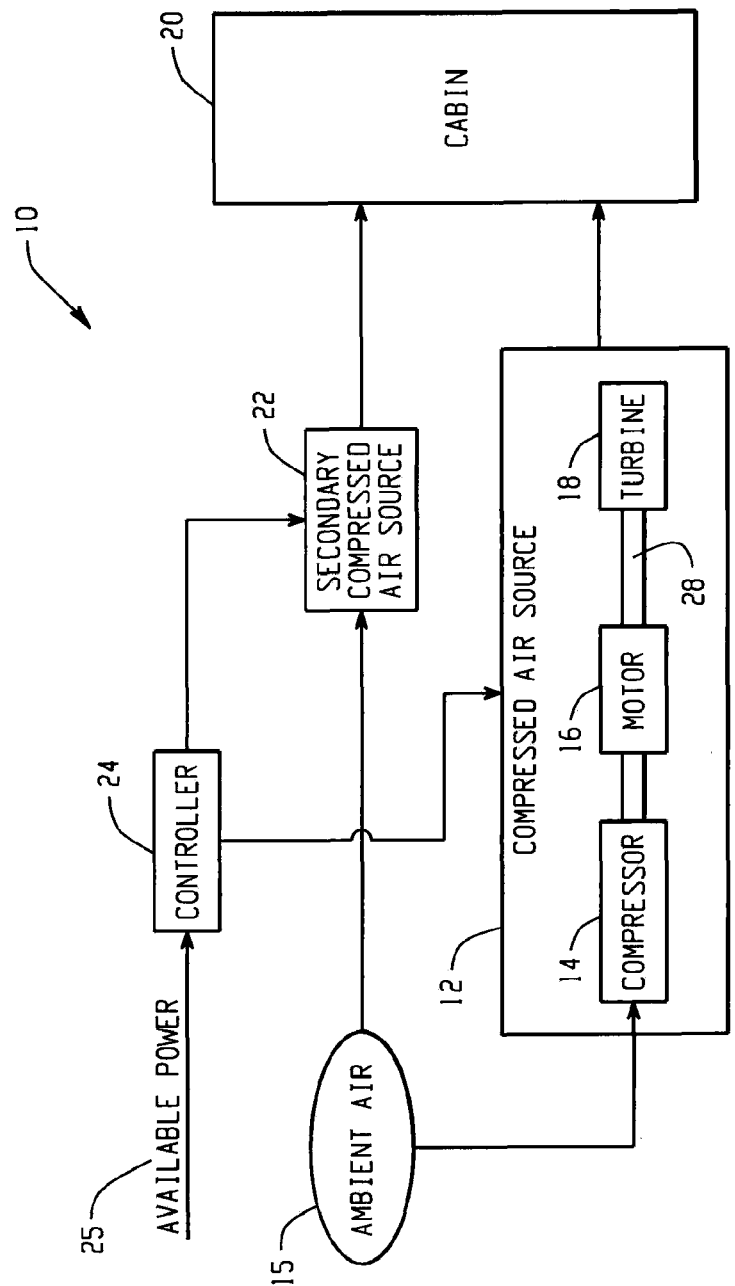
FIG. 1 is a block diagram of an aircraft air-conditioning system in accordance with one embodiment of the present disclosure.

Referring now to FIG. 1, a block diagram of an aircraft air-conditioning system 10 is shown. The aircraft air-conditioning system 10 includes a first compressed air source 12 that can be connected directly or indirectly to the aircraft cabin 20. The first compressed air source 12 includes a compressor 14, a motor 16 and a turbine 18. The compressor 14, motor 16 and turbine 18 are in communication with one another via a shaft 28. The shaft 28 can be unitary or formed of multiple pieces. The compressor 14 receives ambient air 15 and using power provided from either or both of the motor 16 and the turbine 18 compresses the ambient air and forwards compressed ambient air to the aircraft cabin 20. The aircraft air-conditioning system 10 also includes a secondary compressed air source 22, which may also include one or more motors and compressors, which can be connected directly or indirectly to the aircraft cabin 20. The compressors used in the aircraft air-conditioning system 10 may, for example, be a single-stage or also multistage compressors. The compressors used by the first and second compressed air sources 12, 22 require substantial power to operate.

In one embodiment, the aircraft air-conditioning system 10 is designed to be operated in various modes depending upon the available power in the aircraft. The aircraft air-conditioning system 10 can include a controller 24 which receives a signal 25 from the aircraft control system (not shown) that is indicative of the available power in the aircraft. The controller 24 controls the operation of the first and second compressed air sources 12, 22 based upon the available power in the aircraft indicated by signal 25.

In a first operating mode, when the available power in the aircraft is below a threshold value the air supplied to the aircraft cabin 20 is provided only from the first compressed air source 12. This first compressed air source 12 is designed to be able to provide the required pressurization, temperature control and fresh air supply of the cabin during ground operation of the aircraft. In a second operating mode, when the available power in the aircraft is above a threshold value the air supplied to the aircraft cabin 20 is provided from both the first and second compressed air sources 12, 22. In one embodiment, the two compressed air sources can be mixed and then the mixed air can be further treated, such as cooling, humidification or dehumidification before being forwarded to the aircraft cabin. In another embodiment, more than two compressed air sources may be utilized when the available power in the aircraft is above a second threshold value the air supplied to the aircraft cabin 20 can be provided from the first, second and third compressed air sources.

In one embodiment, the compressed air is cooled prior to the entry into the aircraft cabin 20. The cooling may be done by a ram air heat exchanger (not shown) located in a ram air duct of the aircraft and/or by the turbine 18. In the first operating mode, the cooling can be done by both the ram air heat exchanger and by the turbine 18 integrated in the cooling process, with the turbine 18 being coupled on a shaft to the compressor 14 and to the motor 16. One or more turbines 18 can be located on the shaft 28 with the compressor 14.

Figure 2:
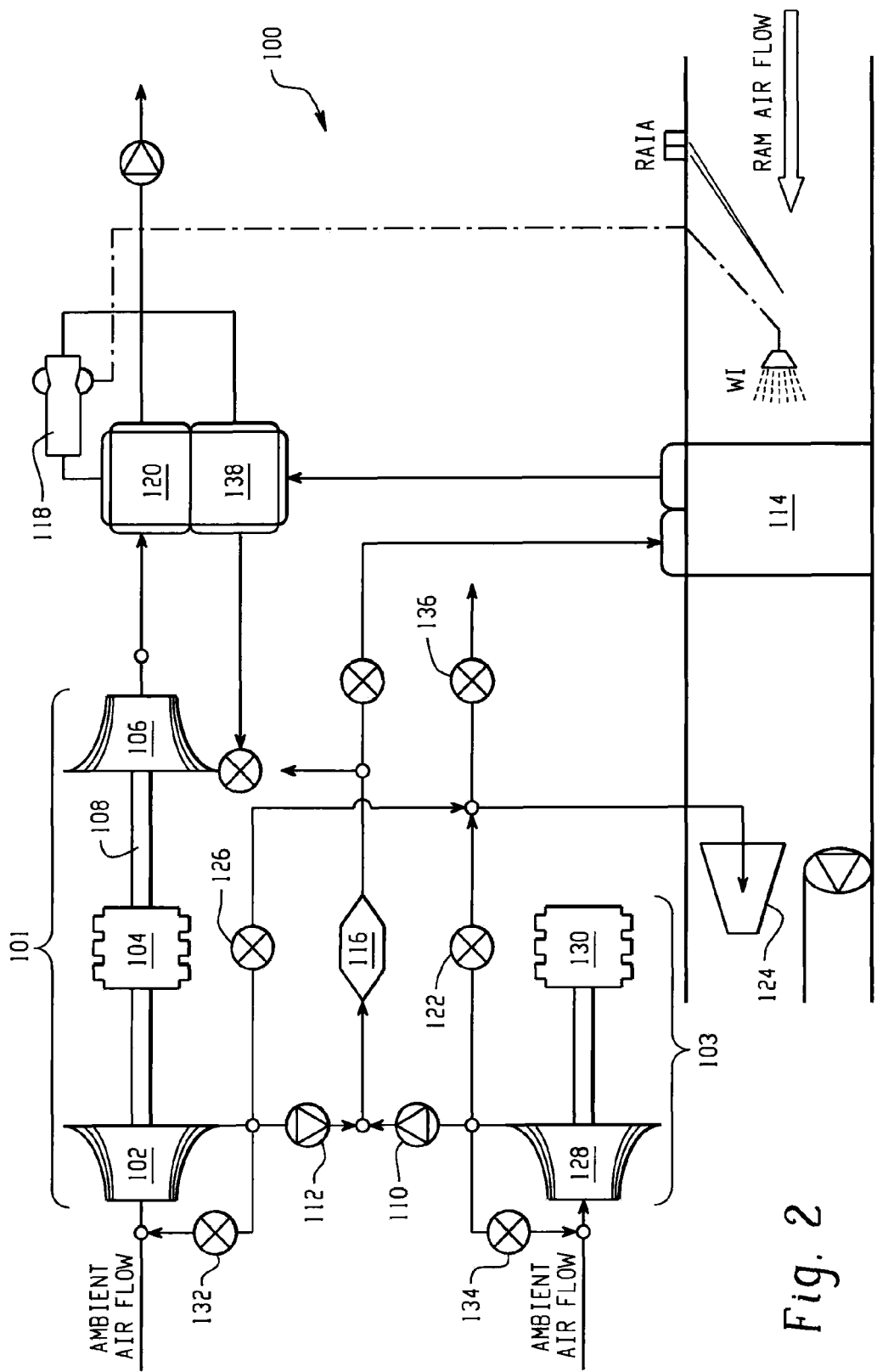
FIG. 2 is a schematic representation of an aircraft air-conditioning system in accordance with another embodiment of the present disclosure.

FIG. 2 shows a schematic representation of an aircraft air-conditioning system 100 in accordance with an embodiment of the present disclosure. The air-conditioning system 100 includes a first compressed air source 101 that includes a compressor 102 charged with ambient air. The compressor 102 is in communication with a motor 104 and a turbine 106 on a shaft 108. The aircraft air-conditioning system 100 also includes a second compressed air source 103 that can be switched on depending on the operating mode in which the system is operated. In one embodiment, the second compressed air source 103 can be switched on or off or also partially switched on by a modulating valve 110. In another embodiment, a check valve can also be arranged instead of the modulating valve 110. The second compressed air source can, for example, be a second motorized compressor 128 charged with ambient air and/or bleed air from the control system of the aircraft. The outlet line of the compressor 102 has a check valve 112 which ensures that the flow through this outlet line does not lead toward the compressor 102.

The system of FIG. 2 can be operated in at least two operating modes based upon the available power in the aircraft. In a first operating mode, the total air supply for the cabin is provided by the compressor 102. The power from the turbine 106, together with the power from the motor 104, the drive of the compressor 102. The compressor 102 is designed to be able to meet the air supply demands of the cabin with respect to pressurization, temperature regulation and fresh air supply. The air output from the compressor 102 is cooled in the ram air duct heat exchanger 114 after passing through the mixing chamber 116. This air subsequently flows through a water extraction circuit and is then subjected to a second cooling in the turbine 106. The water extraction circuit may include a water extractor 118, a reheater 138 and a condenser 120. The water separated in the water extractor 118 may be supplied to the ram air duct via a water injector WI.

In a second operating mode, the valve modulating valve 110, or check valve, is opened and the air provided to the cabin is now formed by the outlet air of the compressor 102 and by the outlet air of the compressor 128. In the second operating mode, the mixed air flow flows through the same components as the outlet air of the compressor 102 in the first operating mode.

Due to the high demanded pressure ratio of the individual compressor stages based on single-stage compression, these compressor stages only achieve a limited operating range for the corrected mass flow. To be able to deliver the corrected mass flow, additional compressor stages or compressed air sources may be switched in parallel. The number of ambient air compressors utilized is not fixed in this connection, with a parallel connection of at least two compressed air sources per air-conditioning system taking place to cover the total application area.

As shown in FIG. 2, the second compressed air source 103 can be used with an open valve 122 to operate the jet pump 124. This has the result that a coolant air flow is also ensured in the first operating mode via the ram air heat exchanger or exchangers. The compressor outlet air of the compressor 102 can also be supplied to the jet pump 124 via a valve 126. Such a procedure may ensure a safe/stable operation of the compressor 102. The additional mass flow is thereby directed via the jet pump 124 into the ram air duct or is alternatively supplied to further consumers. A ram air duct inlet valve may be located at the inlet side of the ram air duct and can be controlled by the ram air inlet actuator (RAIA).

In one embodiment, the second compressed air source 103 is formed by compressor 128 which is driven by a motor 130. It will be appreciated by one of ordinary skill in the art that one or more of these units can also be provided in the system 100. In one embodiment, recirculation lines which can be closed by anti-surge valves 132, 134 are drawn for the compressors 102 and 128, respectively. Furthermore, a further compressor load valve 136 is provided in the line extending from the mixing chamber 116 to the ram air duct heat exchanger 114. The recirculation air can be increased via the compressors 102, 128 by opening the valve anti-surge valves 132, 134, whereby a stable operation of the compressors 102, 128 is enabled. As stated above, the increase in the compressor mass flow can also be realized via the jet pump modulating valves 122, 126. The compressor load valve 136 can be used to restrict the compressors 102, 128 and increase the exit temperature of the compressors 102, 128.

Figure 3:
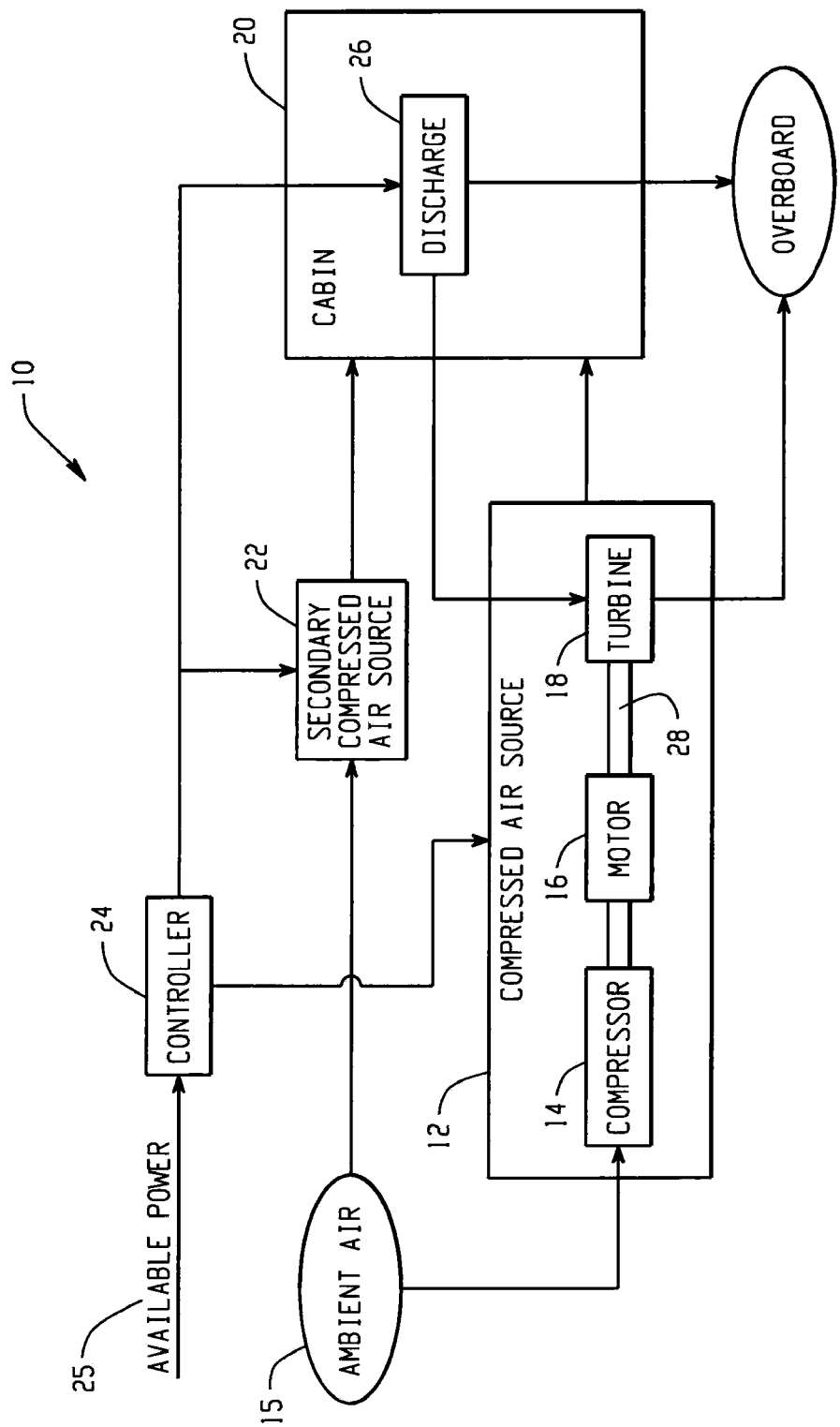
FIG. 3 is a block diagram of an aircraft air-conditioning system including a pressure recovery system in accordance with an embodiment of the present disclosure.

Turning now to FIG. 3, a block diagram of an aircraft air-conditioning system 10 is shown. The aircraft air-conditioning system 10 includes a first compressed air source 12 that can be connected directly or indirectly to the aircraft cabin 20. The first compressed air source 12 includes a compressor 14, a motor 16 and a turbine 18. The compressor 14, motor 16 and turbine 18 are in communication with one another via a shaft 28. The compressor 14 receives ambient air and using power provided from the motor 16 and turbine 18 compresses the ambient air and forwards the ambient air to the aircraft cabin 20. The aircraft air-conditioning system 10 also includes a secondary air source 22, which may also include one or more motors or compressors, which can be connected directly or indirectly to the aircraft cabin 20. The controller 24 receives a signal from the aircraft control system that is indicative of the available power in the aircraft and responsively controls the operation of the first and second compressed air sources 12, 22 based upon the available power in the aircraft.

In current aircraft air-conditioning systems, after being circulated through the cabin pressurized air is removed from the cabin and discarded (i.e., sent "overboard"). Depending upon the altitude of the aircraft, the air pressure outside of the aircraft can be significantly lower than the air being discarded. In one embodiment, the pressurized air being discarded from the cabin 20 is forwarded to the turbine 18, which captures the energy created as the air is depressurized to the ambient air pressure. After passing through the turbine 18, the depressurized air from the cabin is sent overboard. In one embodiment, the turbine 18 may provide the energy captured from the depressurization of the air being discarded from the cabin to the shaft 28 coupled to the motor 16 and the compressor 14. This energy can be used to reduce the energy required from the aircraft to operate the aircraft air-conditioning system 10.

In one embodiment, the aircraft air-conditioning system 10 also includes a discharge device 26, which may be located in the aircraft cabin 20. The discharge device 26 may be controlled by the controller 24, which can instruct the discharge device 26 to forward the circulated air from the aircraft cabin 20 to either the turbine 18 or out of the aircraft. In one embodiment, the controller 24 may instruct the discharge device 26 to forward the circulated air from the aircraft cabin 20 to the turbine 18 if the ambient air pressure is lower than the cabin air pressure and to forward the circulated air from the aircraft cabin 20 out of the aircraft if the ambient air pressure is equal to, or approximately equal to, the cabin air pressure. In another embodiment, the controller 24 may instruct the discharge device 26 to forward the circulated air from the aircraft cabin 20 to the turbine 18 if the difference in the ambient air pressure and the cabin air pressure exceeds a threshold value and to forward the circulated air from the aircraft cabin 20 out of the aircraft if the difference in the ambient air pressure and the cabin air pressure is below a threshold value.

In one operating mode the aircraft may be in an environment with an ambient air pressure of approximately three Psi, or approximately 20.6 kPa, and have a cabin pressure of approximately twelve Psi, or approximately 82.7 kPa. The aircraft air-conditioning system 10 requires approximately one hundred kilowatts of power to pressurize the ambient air from 3 Psi to 12 Psi. In currently available aircraft air-conditioning systems, all of the power needed to pressurize the ambient air is provided from the motor 16. In one embodiment, the turbine 18 captures the energy created by the depressurization of the air being discarded from the cabin and provides the power it creates to the motor 16 and the compressor 14. In the operating mode with an ambient air pressure of approximately three Psi and a cabin pressure of approximately twelve psi, the turbine 18 may generate approximately twenty kilowatts of power. Accordingly, depending upon the operating conditions of the aircraft, capturing the energy created from the depressurization of the discarded air from the cabin can result in up to a twenty percent reduction in power consumption of the aircraft air-conditioning system.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

While the preferred embodiment to the disclosure had been described, it will be understood that those skilled in the art, both now and in the future, may make various improvements and enhancements which fall within the scope of the claims which follow. These claims should be construed to maintain the proper protection for the disclosure first described.

The invention claimed is:

1. A method for operating an air-conditioning system for an aircraft comprising:
    compressing ambient air with a compressor driven by a shaft in communication with a motor and a turbine;
    forwarding the compressed air to an aircraft cabin for circulation;
    removing circulated compressed air from the aircraft cabin;
    forwarding the circulated compressed air to the turbine;
    depressurizing the circulated compressed air in the turbine;
    capturing energy created by depressurizing the circulated compressed air;
    receiving an available power level from a control system of the aircraft, wherein the available power level includes the captured energy from depressurizing the circulated compressed air and wherein the captured energy provides approximately twenty percent of a total power requirement of the compressor; and
    based on a determination that the available power level exceeds a threshold value, forwarding air from a second compressed air source to the aircraft cabin.

2. The method of claim 1, wherein the captured energy is transferred to the motor to power the compressor.

3. The method of claim 1, wherein the compressed air is subjected to cooling prior to entry into the aircraft cabin.

4. The method of claim 1, wherein the compressed air and air from the second compressed air source are mixed before entry to the aircraft cabin.

5. The method of claim 1, wherein the air from the second compressed air sources is formed by a second compressor charged with ambient air, ram air and/or precompressed air and driven by a motor and/or a turbine.

6. An air-conditioning system for an aircraft, comprising:
    a first compressed air source formed by a first compressor charged with ambient air and driven by a motor and a turbine and whose outlet is in communication with an aircraft cabin;
    a discharge device operable for removing circulated compressed air from the aircraft cabin;
    a controller that controls the operation of first compressed air source and the discharge device;
    wherein when an ambient air pressure is lower than a cabin air pressure, the controller instructs the discharge device to forward the circulated compressed air from the aircraft cabin to the turbine and when the ambient air pressure is equal to the cabin air pressure, the controller instructs the discharge device to forward the circulated compressed air from the aircraft cabin out of the aircraft;

wherein the turbine depressurizes circulated compressed air received from the aircraft cabin and captures energy created by depressurization;

a second compressed air source whose outlet can be connected directly or indirectly to the aircraft cabin;

wherein the controller receives an available power level from a control system of the aircraft and responsively controls the first and second compressed air sources, wherein the available power level includes the captured energy created by depressurization and wherein the captured energy provides approximately twenty percent of a total power requirement of the first compressor;

wherein when the power level is below a threshold only the first compressed air source is in communication with the aircraft cabin, and wherein when the power level is above the threshold both the first and the second compressed air sources are in communication with the aircraft cabin.

7. The system of claim 6, wherein the captured energy is provided to the motor to power the compressor.

8. The system of claim 6, wherein air from the first compressed air source and air from the second compressed air source are mixed before entry to the aircraft cabin.

9. The system of claim 6, wherein the air from the second compressed air source is formed by a second compressor charged with ambient air, ram air and/or precompressed air and driven by a motor and/or a turbine.

10. The system of claim 6, wherein the compressed air is subjected to cooling prior to entry into the aircraft cabin.

11. An air-conditioning system for an aircraft, comprising:
a first compressed air source formed by a first compressor charged with ambient air and driven by a motor and a turbine and whose outlet is in communication with an aircraft cabin;
a discharge device operable for removing circulated compressed air from the aircraft cabin;
a controller that controls the operation of first compressed air source and the discharge device;
wherein when a difference between an ambient air pressure and a cabin air pressure exceeds a threshold value, the controller instructs the discharge device to forward the circulated compressed air from the aircraft cabin to the turbine and when the difference is below the threshold value, the controller instructs the discharge device to forward the circulated compressed air from the aircraft cabin out of the aircraft;
wherein the turbine depressurizes circulated compressed air received from the aircraft cabin and captures energy created by depressurization;
a second compressed air source whose outlet can be connected directly or indirectly to the aircraft cabin;
wherein the controller receives an available power level from a control system of the aircraft and responsively controls the first and second compressed air sources, wherein the available power level includes the captured energy created by depressurization and wherein the captured energy provides approximately twenty percent of a total power requirement of the first compressor;
wherein when the power level is below a second threshold only the first compressed air source is in communication with an aircraft cabin, and
wherein when the power level is above the second threshold both the first and the second compressed air sources are in communication with the aircraft cabin.

12. The system of claim 11, wherein the captured energy is provided to the motor to power the compressor.

13. The system of claim 11, wherein air from the first compressed air source and air from the second compressed air source are mixed before entry to the aircraft cabin.

14. The method of claim 11, wherein the air from the second compressed air source is formed by a second compressor charged with ambient air, ram air and/or precompressed air and driven by a motor and/or a turbine.

15. The method of claim 11, wherein the compressed air is subjected to cooling prior to entry into the aircraft cabin.

* * * * *